United States Patent [19]

Possati

[11] 4,231,158
[45] Nov. 4, 1980

[54] ELECTRONIC APPARATUS FOR CHECKING THE LINEAR DIMENSIONS OF MECHANICAL WORKPIECES

[75] Inventor: Mario Possati, Bologna, Italy

[73] Assignee: Finike Italiana Marposs S.p.A., S. Marino, Italy

[21] Appl. No.: 965,528

[22] Filed: Dec. 1, 1978

[30] Foreign Application Priority Data

Dec. 7, 1977 [IT] Italy ................... 3637 A/77

[51] Int. Cl.³ .......................... G01B 5/08; G01B 7/12
[52] U.S. Cl. ................................. 33/149 J; 33/143 L; 33/148 H; 33/178 E
[58] Field of Search ............. 33/149 J, 143 L, 147 N, 33/148 E, 148 H, 178 E, 143 R, 147 L; 51/165 R

[56] References Cited

U.S. PATENT DOCUMENTS

| | | | |
|---|---|---|---|
| 2,732,625 | 1/1956 | Buisson | 33/148 H |
| 3,210,853 | 10/1965 | Wiatt | 33/143 R |
| 3,962,792 | 6/1976 | Štěpánek et al. | 33/143 L |

*Primary Examiner*—Willis Little
*Attorney, Agent, or Firm*—Stevens, Davis, Miller & Mosher

[57] ABSTRACT

Apparatus for checking diameters of workpieces in a broad range of operation, including two arms moving with a scissorwise movement.

The two arms carry relevant measuring heads and are coupled to coaxial shafts.

A rotary transducer has two moving elements coupled to the coaxial shafts. A processing and control circuit includes pre-selectors for zero-setting the apparatus with reference to different diameters to be checked. The processing and control circuit provides a measurement signal depending on the output signals of the measuring heads and of the rotary transducer.

12 Claims, 4 Drawing Figures

ELECTRONIC APPARATUS FOR CHECKING THE LINEAR DIMENSIONS OF MECHANICAL WORKPIECES

The present invention relates to an electronic apparatus for checking the linear dimensions of mechanical workpieces in a wide range of operation including: a frame; two parallel shafts supported by the frame; two arms fixed to the shafts and rotating with them; transducer means to supply a signal responsive to the reciprocal movements of the two amrs; a processing, indication and control unit; and control means to command the movements of the two arms.

More particularly the invention relates to a gauge suitable for checking different diameters of a workpiece while being machined by grinding machines.

Comparator gauges for the checking, during the in-process machining on grinding machines, of various diameters of a workpiece which may differ even by several centimeters are already known.

A comparator gauge of this type is described in Italian Pat. No. 1.010.896.

The gauge includes two rotating arms carrying two feelers which touch the workpiece surface, and two transducers which provide signals responsive to the angular movements of the arms. An electronic circuit processes the signals of the two transducers and provides a signal which is dependent on the movements of the feelers.

One of the inconveniences which occurs with the known gauge is related to the fact that, during measurement taking, owing to the change in the diameter size as a consequence of the stock removal, parts of the gauge having masses and an inertia of considerable entity move. As a consequence there are excessive stresses, problems in safety as wear and response time are concerned and also the impossibility or difficulty in measuring workpieces with grooves.

Another known measuring apparatus which can be considered as an actual absolute measuring apparatus, is described in U.S. Pat. No. 3,996,669. This measuring apparatus consists of two slides movable in a direction parallel to the diameter to be checked, two transducers which allow the positioning of the slides in correspondence to a determined number of reference positions, and two arms fixed to the slides and which carry two measuring heads.

The two transducers provide signals indicative of the position of the slides. Once the slides are positioned, the measurements are effected by utilizing the signals provided by the two measuring heads.

This measuring apparatus partially overcomes the inconvenience, which occurs in other absolute measuring apparatuses already known, of having in movement, during the measurement taking, parts of considerable mass and inertia. In the known measuring apparatus inconveniences which regard repeatability, layout dimensions, wear, seal, operating safety do exist, also because of severe operating conditions which characterize applications on grinding machines.

The technical problem that this invention intends to solve is that of providing an electronic measuring apparatus having a broad range of operation and being suitable for in-process application on grinding machines, having optimum repeatability and tightness, robustness, reliability and ease of use.

This problem is solved by a measuring apparatus of the type previously stated including, according to the invention, two measuring heads adapted to co-operate with the workpiece, arranged at the ends of said arms, said transducer means including a rotary transducer with two elements fixed to said shafts, said processing, indication and control unit being connected to the measuring heads and to the rotary transducer in order to provide signals responsive to the dimensions to be checked and to said control means, in order to activate the same control means.

The invention will be described in detail according to a preferred embodiment illustrated in the accompanying drawings given by way of non-limiting example.

Figure 1:
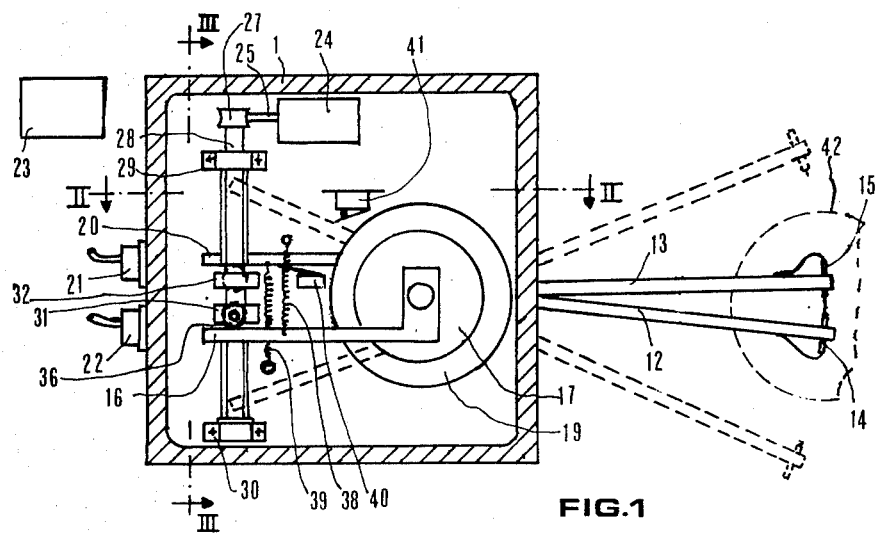
FIG. 1 is a vertical simplified section of a measuring apparatus.

With reference to FIGS. from 1 to 3, the measuring apparatus shown has an outer casing or frame 1 which supports by means of bearings 2 and 3, a hollow shaft 4.

Another shaft 5 is supported inside shaft 4 by bearings 6 and 7. Ring nuts 8 are mounted on shaft 5 to pre-load bearings 6 and 7 in order to ensure the concentricity of shafts 4 and 5.

A closure plate 9 with seal rings 10 and 11 is clamped to casing 1 and enables the rotation of shaft 4.

A first arm 12 is fixed to an end of shaft 4 and a second arm 13 is fixed to an end of shaft 5.

Arms 12 and 13 extend in a perpendicular direction with respect to shaft 4 and 5, and carry at their other ends two gauging heads 14, 15 of the type known as "cartridge", arranged in perpendicular directions with respect to the arms.

Figure 2:
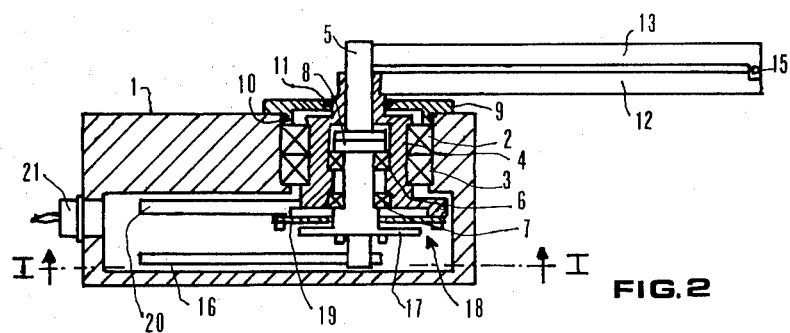
FIG. 2 is a horizontal simplified section, according to path II-II of FIG. 1, of the measuring apparatus of FIG. 1.
Figure 3:
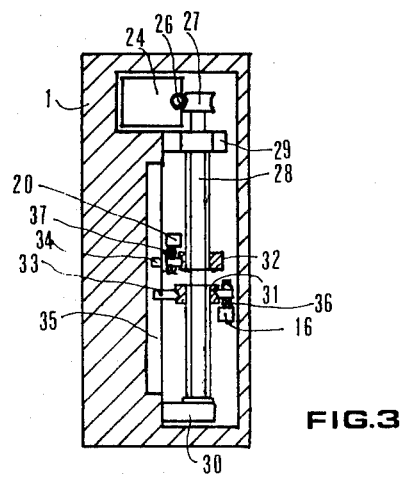
FIG. 3 is a simplified vertical section, according to path III-III of FIG. 1, of the measuring apparatus of the previous figures.

As it may be seen in FIGS. 1 and 2, arms 12 and 13 have a scissorwise movement. When arms 12 and 13 are in a closure position the contacts of heads 14 and 15 are in touch.

Shaft 5 carries at the end opposite to that where arm 13 is fixed an actuation lever 16 and close to it a first ring element 17 of a rotary transducer 18. A second ring element 19 of transducer 18 is mounted on shaft 4, facing element 17. Shaft 4 also carries an actuation lever 20. The measuring heads 14, 15 and the transducer 18 are connected by means of cables and connectors 21 and 22 to a processing, indication and control unit 23.

Unit 23 is also connected to a D.C. motor 24, fixed to casing 1. A shaft 25 of motor 24 drives by means of a worm screw 26 and a helical wheel 27 another shaft 28, supported by supports 29 and 30.

Two bushes 31 and 32 are guided parallel to shaft 28 by pins 33 and 34 located in a groove 35 of frame 1 and have nut screws co-operating with threads of shaft 28. Bearings 36 and 37 are mounted on pins 33 and 34. The actuation levers 16 and 20 are pressed against the outside rings of bearings 36 and 37 by springs 38, 39 connected between the levers and frame 1. A microswitch 40 fixed to frame 1 closes when lever 20 is in the position illustrated with continuous lines in FIG. 1, i.e. when arms 12 and 13 are brought close to one another in such a way that the contacts of heads 14, 15 touch, according to the explanation given hereinafter. Another microswitch 41 fixed to frame 1 closes when lever 20 is in the position shown with dashed lines in FIG. 1, i.e. when arms 12, 13 are open to their utmost, as it is also shown with dashed lines. A section of a workpiece 42 whose diameter has to be checked is also shown with a dashed line.

Figure 4:
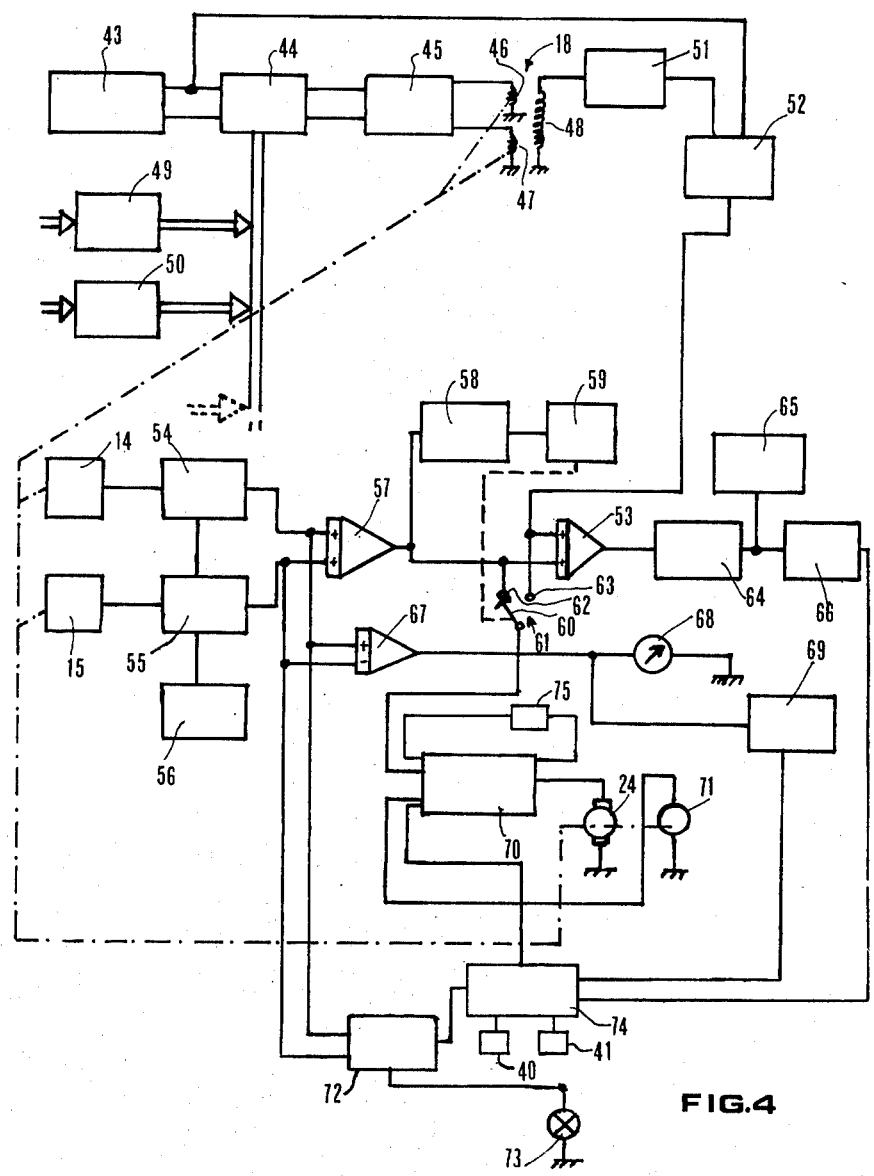
FIG. 4 is a diagram of the electric circuits of the measuring apparatus shown in FIGS. 1, 2 and 3.

With reference to FIG. 4, an oscillator 43 feeds two input windings 46, 47 of transducer 18 by means of a digital phase shifter circuit 44 and a driver circuit 45. The two windings are arranged on ring 19, whereas the output winding 48 is arranged on ring 17. Transducer 18 is of the cyclic absolute type, for example a transducer of the type known as rotary "Inductosyn" ("Inductosyn" is a registered trade-mark).

Some preselectors, two of which are indicated by references 49 and 50, are connected to the phase shifter circuit 44. Winding 48 is connected, by means of an amplifier circuit 51, to an input of a phase detector circuit 52 which receives at another input the oscillator voltage 43.

The output signal of the phase detector 52 reaches an input of an adder circuit 53.

The measuring heads 14 and 15 are connected to two amplifier and detector circuits 54 and 55 which also receive the signal of an oscillator circuit 56 which feeds heads 14 and 15.

An adder circuit 57 has two inputs connected to outputs of the amplifier and detector circuits 54 and 55 and the output connected to a second input of the adder circuit 53 and to an input of a comparator 58.

A control circuit 59 receives the output signal of comparator 58 and commands the movable contact 60 of a change-over switch 61 having two fixed contacts 62 and 63. The fixed contact 62 is inserted in the connection between the output of the adder circuit 57 and an input of the adder circuit 53, whereas the fixed contact 63 is inserted in the connection between the phase detector and the other input of the adder circuit 53. The output of the adder circuit 53 is connected through a filter circuit 64 to a display device 65 and to a control circuit 66.

The outputs of the amplifier and detector circuits 54 and 55 are also connected to a non-inverting input and to an inverting input of an adder circuit 67 whose output is connected to a meter 68 and to an alarm circuit 69. The D.C. motor 24 which actuates the shaft 28 is controlled by the signal at contact 62 or by that at contact 63 by means of a servo-amplifier 70 and a feedback circuit including a speedometer dynamo 71. The output signals of the amplifier and detector circuits 54 and 55 reach a circuit 72 which provides an output signal—whose polarity and level are prefixed—if the stock measured by one or both heads 14 and 15 exceeds a settable value. The output of circuit 72 is connected to an alarm lamp 73. A control and change-over logic unit 74 is connected to microswitches 40 and 41, to circuits 66, 69 and 72 and to servoamplifier 70. Between an input and output of servoamplifier 70 there is connected a circuit 75 which can detect the operating conditions of servoamplifier 70.

A description of the use and operation of the measuring apparatus shown in FIGS. from 1 to 4 follows.

Assume that the measuring apparatus is mounted on an O.D. grinding machine for the grinding of various parts having different diameters of a series of workpieces.

A master piece is placed between the centers of the grinding machine. The master piece has parts with diameters being the same with respect to the nominal ones or differing of known quantities.

The zero setting operations for each diameter are carried out as follows.

For the zero setting and thereafter for the check of each diameter the connection between the phase shifter 44 and an associated preselector 49, 50 . . . is enabled automatically in a known way.

Initially arms 12 and 13 are set apart at their utmost and as the contacts of heads 14 and 15 don't touch the master piece they are at the stroke limit stop position towards the outside of the heads.

By operating a start push-button—not shown—servoamplifier 70 is activatable and it receives the output signal from the adder circuit 57 since the movable contact 60 is closed on fixed contact 62.

This signal commands motor 24 which in turn rotates shaft 28 so that bushes 31 and 32 which were located in a position corresponding to that of levers 16 and 20—marked by a dashed lines on the drawing—move towards each other.

Levers 16 and 20 under the action of springs 38, 39 rotate in a clockwise and counterclockwise direction respectively, while remaining in touch with the outer rings of bearings 36, 37 (FIG. 1).

Motor 24 stops when the value of the sum signal of the outputs of heads 14 and 15 is zero. Circuit 75 thus cuts off the power to servoamplifier 70.

According to the indication of the display device 65 one operates on the selected preselector, for example preselector 49, to make the phase relation of the signals at the input of the phase detector 52 vary and thus the indication of the display device 65, until obtaining the indication of zero.

The setting to zero obtaining in this way relates to the actual zero setting diameter even if the heads 14 and 15 haven't been accurately positioned, reason for which their indications may differ from zero.

Once this operation has been repeated for the various parts of the master piece, by using each time a relevant preselector, it is possible to proceed with the machining under the control of the measuring apparatus, which occurs as follows.

After a workpiece 42 has been loaded, arms 12 and 13 initially still being in a position of max. opening, start to close under the action of motor 24 controlled by the output signal of the adder circuit 57.

The contacts of the heads 14 and 15 touch workpiece 42, and then they move slightly with respect to the head bodies; comparator 58, which compares the input signal with a reference signal, switches over and the control circuit 59, which has been inhibited during the setting to zero by the operator or by the machine logic, makes the movable contact 60 move against the fixed contact 63.

Thus the operation of motor 24 will occur under the control of the output signal of the phase detector 52.

This signal, of cyclic type, applied to servoamplifier 70 drives motor 24 until the closest value to zero of the same signal is obtained. Then servoamplifier 70 is inhibited.

The operating range of the heads 14 and 15 the type of transducer 18—in so far as the amplitude of the rotation angle of the rings 17 and 19 corresponding to the achievement of two zeros of the output signal is concerned—and the lenght of arms 12 and 15 are chosen in such a way so that —if the initial stock of workpiece 42 doesn't have anomalous values—the positioning of arms 12 and 15 before the stock removal from workpiece 42, coincides with the positioning obtained in the course of zero setting on the corresponding part of the master piece.

Thus the removal of stock from workpiece 42 starts in order to obtain the desired diameter.

The machining is controlled by means of control circuit 66 and display device 65, which receive the output signal of summer circuit 53, filtered by filtering circuit 64.

When the input signal of the display device 65 reaches value zero, the control circuit 66 interrupts the machining of the part of the workpiece corresponding to enabled preselector 49 (or 50, . . .).

As the machining is controlled on the ground by the sum of the output signals of phase detector 52 and of adder circuit 57, the possible small positioning errors of motor 24 both in the control phase (during the zero setting) by means of the signal at contact 62, and in the control phase (during machining) by means of the signal at contact 63, do not affect the accuracy of the final dimension of workpiece 42.

After the positioning of arms 12 and 13 with respect to workpiece 42, the field of regular operation of heads 14, 15 should be sufficient to cover with continuity the change in diameter consequent to the stock removal.

At the beginning of the stock removal phase it isn't essential that the operation of heads 14, 15 be linear and that the pointers of the readout meters—not shown—normally associated to the heads be within the scales. In any case these pointers enter within the scale in the course of the stock removal and reach the zero positions (or close to them) at the end of the stock removal phase.

When the stock removal phase ends, control circuit 66 provides a signal to servoamplifier 70 to command the opening of arms 12 and 13 ("retraction" phase). The retraction ends when lever 20 activates microswitch 41.

Conversely, microswitch 40 inhibits servoamplifier 70 when no workpiece is placed on the machine and the contacts of heads 14, 15 contact each other so defining a position equivalent to max. closure of arms 12 and 13. Should workpiece 42 present a considerable eccentricity caused in inaccurate loading of the part between the centers or shape errors, the alarm circuit 69 is activated and it stops machining. The eccentricity value is displayed on meter 68.

In the event that the stock of workpiece 42 is anomalous, circuit 72 provides, through unit 74, a command to servoamplifier 70 in order to have arms 12 and 13 move apart while lamp 73 will signal this abnormal condition.

This will prevent the completing of the positioning of arms 12 and 13 before stock removal, thus eliminating the risk of damage to heads 14 and 15.

From the previous description it should be clear that the zero setting operation is quite simple, and doesn't require any complicated mechanical adjustments. Other advantages consist in the fact that during measurement of every section of the workpiece the only elements moving have small inertia (the contacts and their support shafts), whereas arms 12 and 13 don't move and consist in the absence of transmissions entailing backlash and friction between moving arms 12 and 13 and rings 17 and 19 of transducer 18.

The contact measuring pressure is determined by heads 14 and 15 only and this also gives a contribute in obtaining an optimum repeatability. The apparatus can also be used for the checking of grooved surfaces. In this case it could be useful to employ heads 14 and 15 provided with hydraulic damping means and operate suitable potentiometers for the adjustment of the filter circuit 64 in order to filter the output signal of adder circuit 53. The filter circuit 64 may consist of a plain filter with an adjustable time constant.

In order to have the measuring apparatus operate correctly it is important that the position of the geometric axis of shafts 4 and 5 with respect to axis of workpiece 42 be exactly defined.

In view of this the installation of the measuring apparatus on the grinding machine should be carried out by means of accurate supports and slides.

However it isn't necessary to obtain the positioning of contacts of heads 14 and 15 along a diameter of workpiece 42. Besides, it is obvious that if the measuring apparatus isn't moved, while the diameter of the section being checked changes, the distance between the straight line through the contacts and the axis of the workpiece 42 also varies. The scissorwise arrangement of arms 12 and 13 the necessity of effecting zero setting operations plus the fact that, according to the functioning principle previously described, the measuring apparatus acts as a multigauge and doesn't provide any absolute diameter measurements, may seem considerably limiting as compared to the known absolute measuring apparatuses using moving arms with vertical translation movement and blade contacts to guarantee that the workpiece checkings actually occur on diameters instead of chords.

However it is pointed out that when absolute measuring apparatuses are used on grinding machines the working conditions are so severe that it is necessary for these apparatuses too to carry out zero setting operations by means of a master or by checking the first workpiece machined and successively setting corrections for the displayed values.

Also the use of absolute measuring apparatuses or that of gauges on grinding machines usually only relates the machining of large batches of workpieces. In these circumstances the absolute measurement of workpiece diameters in the course of machining practically is of no use, as the only problem is that of reproducing workpieces with as far as possible the same geometrical characteristics.

Therefore measuring accuracy or the possibility of performing absolute measurements aren't important factors. A really essential requirement of a measuring apparatus for these applications is good repeatability, which is a very good quality of the described measuring apparatus, as it is evident from the preceding description.

Moreover, the measuring apparatus, according to the invention, can also be employed as an absolute measuring apparatus, apart from its use as a multigauge.

In fact, it is obvious that if the frame 1 of the measuring apparatus has a fixed position with respect to the axis of the workpiece (e.g. the position shown in FIG. 1, wherein when arms 12 and 13 are closed the contacts of heads 14 and 15 touch at a point lying on the axis of the workpiece 42) every (chordal) distance between the contacts corresponds to a relevant diameter value.

Therefore, if one wishes it is possible to set to zero the measuring apparatus when the contacts are in touch with each other and to process the output signal of the adder circuit 53, by means of a circuit which in this case is provided in the display device 65, in order to obtain the absolute indication of the diameter of the checked section of the workpiece.

In the applications for grinding machines a good sealing of the measuring apparatus is important for the reason that the coolant jet and the removed chips fall on it as well as on the workpiece too.

The use of moving arms 12 and 13 having a scissorwise movement and being supported by coaxial shafts 4 and 5 makes is possible to easily ensure the sealing within frame 1. The question of sealing of heads 14 and 15, having reduced dimensions and masses is also easy to deal with.

Obviously the afore described measuring apparatus can undergo other variants and changes equivalent from a functional and structural point of view without falling outside the scope of the present invention.

I claim:

1. An electronic apparatus for checking the linear dimensions of mechanical workpieces in a wide range of operation including: a frame; two parallel shafts supported by the frame; two arms fixed to the shafts and rotating with them; transducer means to supply a signal responsive to the reciprocal movements of the two arms; a processing, indication and control unit; and control means to command the movements of the two arms comprising two measuring heads adapted to co-operate with the workpiece, arranged at the ends of said arms, said transducer means including a rotary transducer with two elements fixed to said shafts, said processing, indication and control unit being connected to the measuring heads and to the rotary transducer in order to provide signals responsive to the dimensions to be checked and to said control means, in order to activate the same control means.

2. Measuring apparatus according to claim 1 wherein said shafts are coaxial.

3. Measuring apparatus according to claim 2, wherein one of said shaft is hollow, the other shaft being arranged within the hollow shaft.

4. Measuring apparatus according to any one of claims 1 to 3, characterized in that said control means include a motor, a shaft perpendicular to said parallel shafts and driven by the motor, two bushings moving on said shaft driven by the motor and transmission means adapted to transmit movement from said bushings to the two parallel shafts, to control a scissorwise movement of the two shafts.

5. Measuring apparatus according to claim 4, wherein said control means include two limiting devices to define the positions of max. opening and closure of said arms.

6. Measuring apparatus according to any one of claims 1-3 wherein said rotary transducer is an absolute cyclic transducer.

7. Measuring apparatus according to claim 6, wherein said processing indication and control unit includes a plurality of preselectors to set to zero the measuring apparatus on different reference dimensions, said control means including a servoamplifier for the control of said motor and switching means to selectively apply to said amplifier a signal responsive to signals of said measuring heads and a signal responsive to the output signal of said transducer.

8. Measuring apparatus according to claim 7, for controlling the machining of a workpiece on a grinding machine, wherein said processing, indication and control unit includes a display device for providing indications responsive to said linear dimensions and a control device of the grinding machine cycle, the display device and the control device being adapted to receive a sum signal of said signal responsive to the signals of said measuring heads and of the signal responsive to the output signal of said transducer.

9. Measuring apparatus according to claim 8, wherein said switching means include a two position selector switch to selectively apply to said servoamplifier the signal responsive to the signals of the measuring heads, for the zero setting positioning of said arms in correspondence to a null value of this signal, and the signal responsive to the output signal of said transducer for the positioning of said arms on the workpiece to be ground.

10. Measuring apparatus according to claim 9, wherein said processing, indication and control unit includes a comparator circuit to supply a control signal for controlling said selector switch after the settlement of the co-operation between said measuring heads and the workpiece to be ground.

11. Measuring apparatus according to claim 10, wherein said processing, indication and control unit includes a circuit adapted to receive the signals from said heads in order to determine the eccentricity of the workpiece and stop the machining if the eccentricity exceeds a prefixed value.

12. Measuring apparatus according to claim 10, wherein said processing, indication and control unit includes a circuit adapted to receive signals from said heads in order to determine the stock of the workpiece and stop the machining if the amount of stock exceeds a prefixed value.

* * * * *

UNITED STATES PATENT AND TRADEMARK OFFICE
CERTIFICATE OF CORRECTION

PATENT NO. : 4,231,158
DATED : November 4, 1980
INVENTOR(S) : Mario POSSATI

It is certified that error appears in the above-identified patent and that said Letters Patent are hereby corrected as shown below:

correct the name of Assignee from "Finike Italiana Marposs S.p.A. S. Marino, Italy" to -- Finike Italiana Marposs S.p.A. S. Marino, Italy (BO) --.

column 2, line 27, insert reference -- 2 -- after "bearings";

column 2, line 37, correct "shaft" to -- shafts --;

column 4, line 65, correct the spelling of -- length --;

column 4, lines 65 and 68, correct reference "15" to -- 13 --;

column 7, line 24, insert a comma after "arms";

column 7, line 39, correct "characterized in that" to -- wherein column 8, line 2, insert a comma after "1-3".

Signed and Sealed this

Sixteenth Day of June 1981

[SEAL]

Attest:

RENE D. TEGTMEYER

Attesting Officer

Acting Commissioner of Patents and Trademarks

UNITED STATES PATENT AND TRADEMARK OFFICE
CERTIFICATE OF CORRECTION

PATENT NO. : 4,231,158
DATED : November 4, 1980
INVENTOR(S) : Mario Possati

It is certified that error appears in the above—identified patent and that said Letters Patent is hereby corrected as shown below:

On The Title Page Item (73) should read

-- (73) Assignee: Finike Italiana Marposs S.P.A. Bentivoglio - S. Marino (BO), Italy --.

Signed and Sealed this

Twenty-seventh Day of October 1981

[SEAL]

Attest:

Attesting Officer

GERALD J. MOSSINGHOFF
Commissioner of Patents and Trademarks